US007972466B2

(12) United States Patent
Martínez Cerezo et al.

(10) Patent No.: US 7,972,466 B2
(45) Date of Patent: Jul. 5, 2011

(54) PROCESS FOR MANUFACTURING COMPOSITE MATERIAL STRUCTURES WITH COLLAPSIBLE TOOLING

(75) Inventors: Alberto Ramón Martínez Cerezo, Madrid (ES); Aquilino García García, Madrid (ES); Yolanda Miguez Charines, Madrid (ES); Patricia Tabares Fernandez, Madrid (ES)

(73) Assignee: Airbus España, S.L., Madrid (ES)

( * ) Notice: Subject to any disclaimer, the term of this patent is extended or adjusted under 35 U.S.C. 154(b) by 1061 days.

(21) Appl. No.: 11/726,362

(22) Filed: Mar. 21, 2007

(65) Prior Publication Data

US 2008/0202680 A1 Aug. 28, 2008

(30) Foreign Application Priority Data

Mar. 31, 2006 (WO) ................. PCT/ES2006/070039

(51) Int. Cl.
*B29C 65/00* (2006.01)
*B32B 37/00* (2006.01)
(52) U.S. Cl. ...................... 156/307.1; 156/155; 156/210
(58) Field of Classification Search .................. 156/155, 156/189, 210, 307.1, 307.7; 244/119
See application file for complete search history.

(56) References Cited

U.S. PATENT DOCUMENTS

| 2,454,719 | A | * | 11/1948 | Scogland | 156/155 |
| 4,681,724 | A | * | 7/1987 | Faiz et al. | 264/257 |
| 4,946,526 | A | * | 8/1990 | Petty-Galis et al. | 156/155 |
| 5,170,967 | A | * | 12/1992 | Hamamoto et al. | 244/119 |
| 6,746,642 | B2 | * | 6/2004 | Buge et al. | 264/510 |

* cited by examiner

*Primary Examiner* — John L Goff, II
(74) *Attorney, Agent, or Firm* — Ladas & Parry LLP

(57) ABSTRACT

A process for manufacturing stiffened structures (11) in composite materials formed by an outer coating (13) and a plurality of stiffeners (15) the cross-section of which has a closed form delimiting an inner opening (23), comprising the following steps: a) Providing a shaping tool (31); b) Providing auxiliary male tools (37) with an inert material inside them coated with membranes suitable for curing c) Providing stiffeners (15) in fresh or cured condition; d) Arranging the stiffeners (15) in the tool (31) and the auxiliary male tools (37) in their inner openings (23); e) Laminating the outer coating (13); f) Curing the stiffened structure (11) with high temperature and pressure; g) Removing the auxiliary male tools (37) after reducing their volume by withdrawing the inert material thereof; h) Separating the cured stiffened structure (11) from the tool (31). The invention also relates to the auxiliary male tools.

7 Claims, 2 Drawing Sheets

PROCESS FOR MANUFACTURING COMPOSITE MATERIAL STRUCTURES WITH COLLAPSIBLE TOOLING

FIELD OF THE INVENTION

The present invention relates to a process for manufacturing structures formed by a lining with closed section stiffeners, manufactured with composite material, particularly applicable to aeronautic fuselages.

BACKGROUND OF THE INVENTION

Weight is an essential aspect in the aeronautical industry, therefore optimized structures manufactured with composite materials prevail over metallic ones.

Automatic carbon fibre taping machines are a great development with respect to manual operation. These machines have a head which presses the surface to be taped, so said surface must react said force.

Applying the foregoing aspects to aeronautical fuselages leads to integrating the panels with their stiffeners in the lowest number of operations and to optimizing said stiffeners.

Closed section stiffeners allow achieving stiffer structures by adding a lower weight per stiffener. Incorporating this type of stiffener complicates the manufacturing process because it requires tools inside the stiffeners allowing the taping of the piece and the curing operation of the composite material and removing the stiffeners from inside the stiffener if this is intended to be hollow.

Processes for manufacturing said structures are known in which a stiff element is introduced inside the stiffener section to react the taping pressure and the composite material curing pressure.

These processes are expensive so it is desirable to have more efficient processes, an objective which is achieved by the present invention.

SUMMARY OF THE INVENTION

In a first aspect, the present invention proposes a process for manufacturing stiffened structures in composite materials formed by an outer coating and a plurality of stiffeners the cross-section of which has a broken contour with at least one flange joined to the coating, said contour delimiting an inner opening, characterized in that it comprises the following steps:

Providing a shaping tool with an outer surface with a shape similar to that of the structure on the side of the stiffeners, including mortises to house the stiffeners.
  Providing auxiliary male tools consisting of containers of inert material capable of carrying their volume, shaped with a geometry similar to the inner opening of the stiffeners and coated with membranes suitable for curing composite materials. The inert material, for example sand, must be compactable, with or without binder, for giving it the required shape, and in turn, the container must allow to easily withdraw the material partially or totally.
  Providing stiffeners in fresh or cured state;
  Arranging the stiffeners in the mortises of the tool, adapting them to the geometry of the mortises and arranging in their inner openings the auxiliary male tools, adapted to their geometry. In this step, the auxiliary male tools help the curing membrane to adapt itself to the inner geometry of each stiffener.
  Laminating the outer coating on the surface formed by the tool, the stiffeners and the auxiliary male tools. The shaping tool and the auxiliary male tools react to the laminating force.
  Curing the stiffened structure.
  Removing the auxiliary male tools after reducing their volume by withdrawing the inert material thereof.
  Separating the cured stiffened structure from the tool.

In a second aspect, the present invention provides a process for manufacturing stiffened structures in composite materials formed by an outer coating and a plurality of stiffeners the cross-section of which has a broken contour with at least one flange joined to the coating, said contour delimiting an inner opening, characterized in that it comprises the steps of the foregoing process until the curing process and a subsequent step of removing the shaping tool from the structure. That is, the basic difference with the foregoing process is that the structure is removed from the shaping toll before curing.

In a third aspect, the present invention provides auxiliary male tools used in the foregoing processes in which the inert material is a granular material, for example sand.

An advantage of the present invention is that it facilitates manufacturing structures in which the section and the area of the stiffeners vary longitudinally and even have smaller dimensions than the intermediate section in one or both ends, because the auxiliary male tools can be shaped so as to be adapted to it.

Another advantage is that it facilitates using machines with a pressing taping head because the auxiliary male tools provide a substrate inside the stiffeners for reacting the force of the head.

Other features and advantages of the present invention will be disclosed in the following detailed description of an illustrating embodiment of the object relating to the attached drawings.

DETAILED DESCRIPTION OF THE INVENTION

Figure 1A:
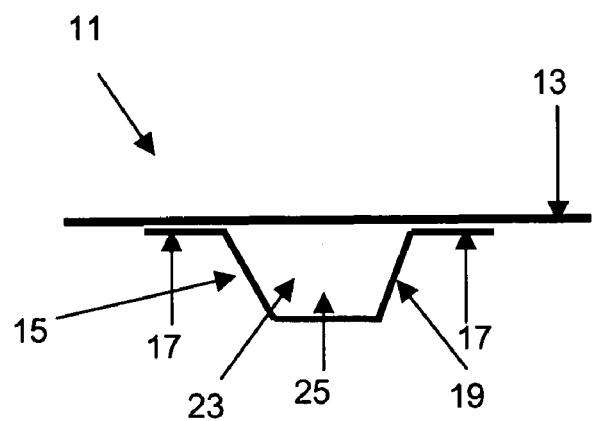
FIGS. 1a, 1b and 1c show schematic views of structures formed by a coating and a plurality of omega, trapezium and irregular Z shaped stiffeners, respectively.
Figure 1B:
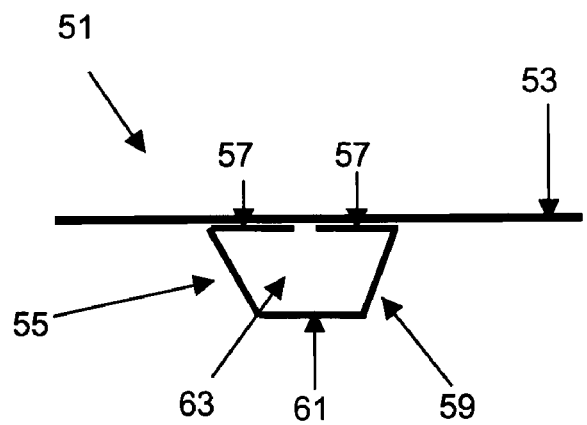
Figure 1C:
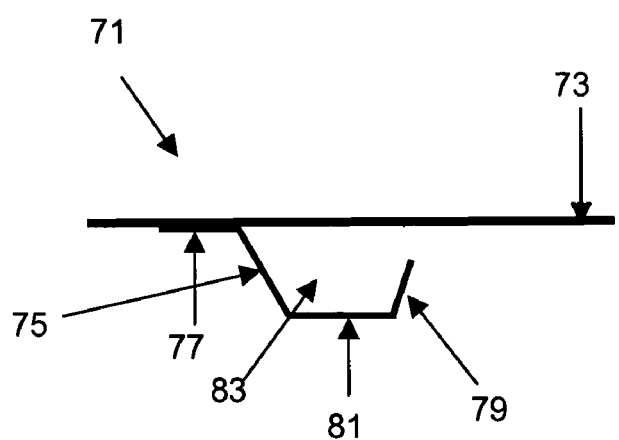

An embodiment of the process according to the invention for manufacturing stiffened structures 11 in composite materials formed by a coating 13 and a plurality of omega-shaped (Ω) stiffeners 15 with flanges 17 joined to coating 13, and cores 18 and head 21 separated from it will be described later on.

The process object of the present invention is also applicable for manufacturing a stiffened structure 51 formed by a coating 53 and a plurality of trapezium-shaped stiffeners 55 with flanges 57 joined to coating 53, and cores 59 and head 61 separated from it, as well as a stiffened structure 71 formed by a coating 73 and a plurality of irregular Z-shaped stiffeners 75 with a flange 77 joined to the coating 73, and cores 79 and head 81 separated from it.

What stiffeners 15, 55 and 75 have in common is that their cross-section has a broken contour with at least a flange 17, 57, 77 joined to the coating 13, 53, 73 said contour delimiting an inner opening 23, 63, 83.

Structures 11, 51, 71 can have an open form or a revolving piece form as in the case of airplane fuselage pieces.

Figure 2:
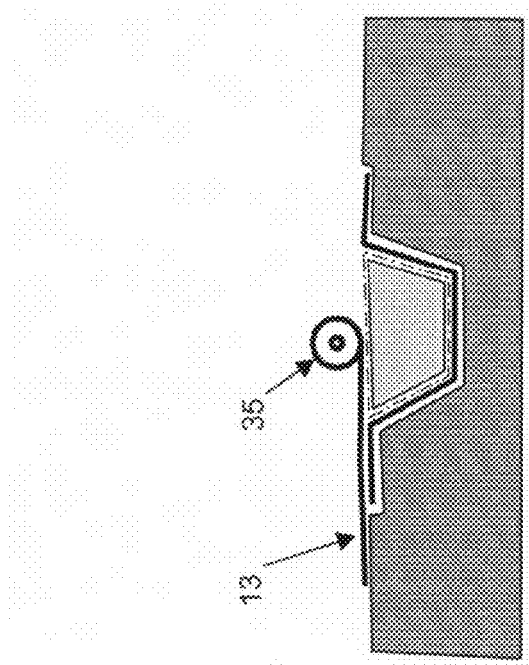
FIG. 2 schematically shows the steps of the process according to the invention for manufacturing a structure formed by a coating and a plurality of omega-shaped stiffeners by means of which the stiffeners and auxiliary male tools coated by a membrane suitable for curing are arranged in the structure shaping tool.

Proceeding now to the description of the process, it can be observed by following FIG. 2, that the omega-shaped stiffeners 15 are placed on the shaping tool 31 having mortises 33, and auxiliary male tools 37 coated with a membrane 39 suitable for curing composite materials are placed on the stiffeners.

Cured or uncured stiffeners 15 can be used.

Male auxiliary tools 37 are obtained by confining an inert granular material, for example sand, n a container and providing it with a geometry similar to the inner opening 23 of the stiffener, using for that purpose a container of a suitable material and a suitable shaping technique. The granular material allows compaction with or without a binder.

When each auxiliary male tool 37 is introduced in the opening 23 of the stiffener 15, the curing membrane 39 is aided in being coupled to the inner geometry of each stiffener 15.

The stiffeners 15 and the male tools 37 can be arranged on the shaping tool 31, having been previously coupled.

Figure 3:
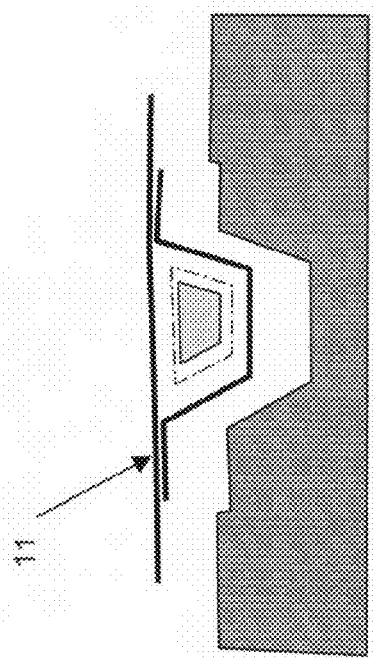
FIG. 3 schematically shows the step of the process according to the invention for manufacturing a structure formed by a coating and a plurality of omega-shaped stiffeners by means of which the taping process of the coating is carried out.

It can be observed in FIG. 3 that in a subsequent step, coating 13 is laminated by means of the head 35 of a taping machine on the surface formed by the shaping tool 31, the stiffeners 15 and the membrane 39 coating the auxiliary male tools 37. In this step, the shaping tool 31 and the auxiliary male tools 37 react the force of the taping head 35.

A variant of the process is the manual taping operation of coating 13.

Figure 4:
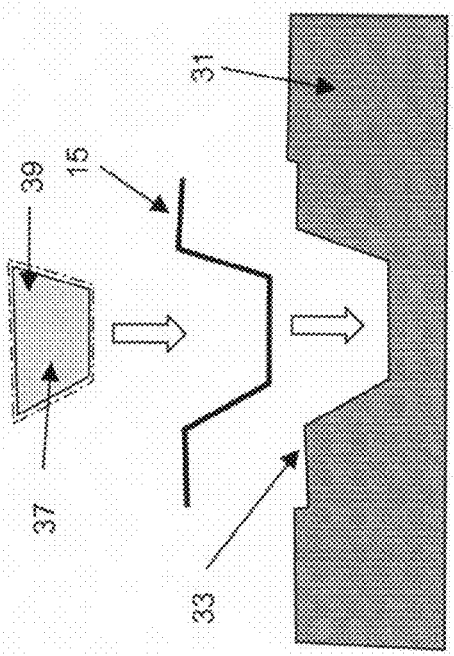
FIG. 4 schematically shows the step of the process according to the invention for manufacturing a structure formed by a coating and a plurality of omega-shaped stiffeners by means of which the curing process is carried out.

It can be observed in FIG. 4 that in a subsequent step, a curing membrane 41, and optionally a hold-down plate 43, is placed on the overall structure. Then, the structure is cured in high temperature and pressure conditions in an autoclave. During the curing process, membrane 39 coating the auxiliary male tools 37 communicates the inside of the stiffeners 15 with the inner autoclave atmosphere and achieves maintaining the surrounding composite material, i.e. the composite material of the stiffener 15 and of the laminating 13, pressed, producing the curing.

A variant of the process is curing without the need for an autoclave. In another variant, the auxiliary male member may be removed prior to curing.

Figure 5:
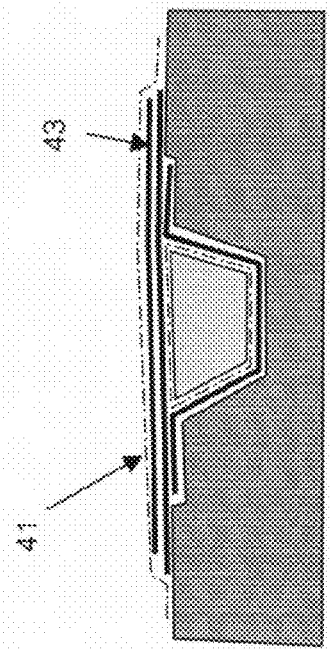
FIG. 5 schematically shows the steps of the process according to the invention for manufacturing a structure formed by a coating and a plurality of omega-shaped stiffeners by means of which the volume of the auxiliary male tools is reduced and the structure is separated from the tools used for its manufacturing.

Once the structure 11 is cured and cooled, the substrate inner to the auxiliary male tools 37 is removed, as illustrated in FIG. 5 by depicting them with a size smaller than the initial size, for facilitating the separation of structure 11 from the shaping tool 31 and the removal of the auxiliary male tools 37 from inside the stiffeners 15.

Modifications comprised within the scope defined by the following claims can be introduced in the preferred embodiment which has just been described.

The invention claimed is:

1. A process for manufacturing stiffened structures in composite materials formed by an outer coating and a plurality of stiffeners the cross-section of which has a broken contour with at least one flange joined to the coating, said contour delimiting an inner opening, characterized in that it comprises the following steps:
    a) Providing a tool with an outer surface with a shape similar to that of structure on the side of the stiffeners, including mortises to house the stiffeners;
    b) Providing auxiliary male tools consisting of inert material in containers capable of varying their volume, shaped with a geometry similar to the inner opening of the stiffeners and coated with membranes suitable for curing composite materials;
    c) Providing stiffeners in uncured or cured condition;
    d) Arranging the stiffeners in the mortises of the tool, adapting them to the geometry of the mortises and arranging in their inner openings the auxiliary male tools, adapted to their geometry;
    e) Applying the outer coating on the surface formed by the tool, the stiffeners and the auxiliary male tools;
    f) Removing the auxiliary male tools after reducing their volume by withdrawing the inert material thereof;
    g) After step (f), curing the stiffened structure;
    h) Separating the cured stiffened structure from the tool.

2. A process for manufacturing stiffened structures in composite materials according to claim 1, characterized in that the stiffened structure is a revolving piece.

3. A process for manufacturing stiffened structures in composite materials according to claim 1, characterized in that the stiffeners have an omega shape.

4. A process for manufacturing stiffened structures in composite materials according to claim 1, characterized in that in step d) the stiffeners are arranged in the mortises of the tool having previously coupled the auxiliary male tools in their inner openings.

5. A process for manufacturing stiffened structures in composite materials according to claim 1, characterized in that step e) is carried out by a head of a taping machine.

6. A process for manufacturing stiffened structures in composite materials according to claim 1, characterized in that before step g) a hold-down plate is placed on the coating.

7. A process for manufacturing stiffened structures in composite materials according to claim 1, characterized in that step g) is carried out in an autoclave in high temperature and pressure conditions.

* * * * *